United States Patent
Zhu et al.

(10) Patent No.: US 12,506,975 B2
(45) Date of Patent: Dec. 23, 2025

(54) VEHICLE WINDOW COLOR STRIPE PROCESSING METHOD AND APPARATUS, STORAGE MEDIUM, AND ELECTRONIC DEVICE

(71) Applicant: ZHEJIANG UNIVIEW TECHNOLOGIES CO., LTD., Hangzhou (CN)

(72) Inventors: Yubao Zhu, Hangzhou (CN); Fuqiang Wang, Hangzhou (CN); Yue Sun, Hangzhou (CN)

(73) Assignee: ZHEJIANG UNIVIEW TECHNOLOGIES CO., LTD., Hangzhou (CN)

( * ) Notice: Subject to any disclaimer, the term of this patent is extended or adjusted under 35 U.S.C. 154(b) by 105 days.

(21) Appl. No.: 18/690,555

(22) PCT Filed: Jul. 13, 2022

(86) PCT No.: PCT/CN2022/105330
§ 371 (c)(1),
(2) Date: Mar. 8, 2024

(87) PCT Pub. No.: WO2023/045513
PCT Pub. Date: Mar. 30, 2023

(65) Prior Publication Data
US 2025/0005893 A1   Jan. 2, 2025

(30) Foreign Application Priority Data

Sep. 22, 2021  (CN) .......................... 202111107843.8

(51) Int. Cl.
*G06V 20/52* (2022.01)
*G06V 10/141* (2022.01)
(Continued)

(52) U.S. Cl.
CPC ......... *H04N 23/951* (2023.01); *G06V 10/141* (2022.01); *G06V 10/72* (2022.01);
(Continued)

(58) Field of Classification Search
None
See application file for complete search history.

(56) References Cited

U.S. PATENT DOCUMENTS

| | | | |
|---|---|---|---|
| 2008/0175438 A1* | 7/2008 | Alves | ................... G08G 1/0175 382/104 |
| 2009/0160944 A1 | 6/2009 | Trevelyan et al. | |

(Continued)

FOREIGN PATENT DOCUMENTS

| | | |
|---|---|---|
| CN | 110738609 A | 1/2020 |
| CN | 111131724 A | 2/2020 |

(Continued)

OTHER PUBLICATIONS

International Search Report in Application No. PCT/CN2022/105330, dated Oct. 9, 2022, 4 pages, including translation.

(Continued)

*Primary Examiner* — Frank Johnson
(74) *Attorney, Agent, or Firm* — MASCHOFF BRENNAN

(57) ABSTRACT

A vehicle window color stripe processing method and a vehicle window color stripe processing apparatus, a storage medium and an electronic device are provided. The method includes: extracting a first vehicle window image in a to-be-processed image, where the first vehicle window image is an image with color stripes; and inputting the first vehicle window image into a pre-trained vehicle window color stripe processing model and obtaining a second vehicle window image output by the pretrained vehicle window color stripe processing model. The second vehicle window (Continued)

image is an image without color stripe, or, the intensity of color stripes in the second vehicle window image is lower than that of the color stripes in the first vehicle window image.

20 Claims, 5 Drawing Sheets

(51) Int. Cl.
*G06V 10/72* (2022.01)
*G06V 10/75* (2022.01)
*G06V 10/774* (2022.01)
*G06V 20/54* (2022.01)
*H04N 23/951* (2023.01)
*H04N 25/51* (2023.01)

(52) U.S. Cl.
CPC .......... *G06V 10/751* (2022.01); *G06V 10/774* (2022.01); *G06V 20/54* (2022.01); *G06V 2201/08* (2022.01); *H04N 25/51* (2023.01)

(56) References Cited

U.S. PATENT DOCUMENTS

2012/0229681 A1 9/2012 Ansfield et al.
2019/0052792 A1* 2/2019 Baba .................... H04N 13/327
2023/0290172 A1* 9/2023 Ali ......................... H04N 23/66
2024/0040267 A1* 2/2024 Kim ....................... H04N 23/81

FOREIGN PATENT DOCUMENTS

| CN | 111476737 A | 7/2020 |
| CN | 112801888 A | 5/2021 |
| CN | 112907467 A | 6/2021 |

OTHER PUBLICATIONS

First Office Action in Chinese Application No. 202111107843.8, dated Feb. 8, 2025, 13 pages, including translation.
Extended European Search Report for Application No. 22871572.8, dated Jun. 24, 2025, 36 pages.
Hu Chang-Hui et al: "Toward Driver Face Recognition in the Intelligent Traffic Monitoring Systems", IEEE Transactions on Intelligent Transportation Systems, IEEE, Piscataway, NJ, USA, vol. 21, No. 12, Oct. 14, 2019 (Oct. 14, 2019), pp. 4958-4971, XP011822832, ISSN: 1524-9050, DOI:10.1109/TITS.2019. 2945923 [retrieved on Nov. 25, 2020] * abstract * * sections "I. Introduction", "V.D. CMC Curves of Some Compared Methods" *.

* cited by examiner

VEHICLE WINDOW COLOR STRIPE PROCESSING METHOD AND APPARATUS, STORAGE MEDIUM, AND ELECTRONIC DEVICE

CROSS REFERENCE TO RELATED APPLICATIONS

This is a national stage application filed under 37 U.S.C. 371 based on International Patent Application No. PCT/CN2022/105330, filed Jul. 13, 2022, which claims the priority of Chinese Patent Application No. 202111107843.8, filed with the Chinese Intellectual Property Administration on Sep. 22, 2021, the disclosures of which are incorporated herein by reference in their entireties.

FIELD

Embodiments of the present application relate to the field of image processing technology, for example, to a vehicle window color stripes processing method, a vehicle window color stripes processing apparatus, a storage medium and an electronic device.

BACKGROUND

With the development of international and domestic security monitoring, safe cities, intelligent transportation and other special fields, and the improvement of demand for intelligent traffic checkpoint and electronic police illegal capture systems, the quality requirements for face capture images of intelligent traffic checkpoint cameras are also getting higher and higher. However, most of the vehicle window images currently taken have severe color stripes issue, which severely reduces the accuracy of face recognition. The reason is that for the sake of heat insulation or anti-glare, a film is attached onto the vehicle window glass. Moreover, in order to reduce the polarized light of the vehicle window glass, the current capture camera may be installed with a polarizer in front of the image sensor or lens. The combination of the two factors causes severe color stripes in the captured vehicle window images. Based on meeting the requirements of high image quality and high face recognition rate of intelligent traffic capture systems, how to eliminate vehicle window color stripes is becoming an urgent issue to be addressed.

SUMMARY

A vehicle window color stripe processing method, a vehicle window color stripe processing apparatus, a storage medium and an electronic device are provided according to embodiments of the present application.

In a first aspect, a vehicle window color stripe processing method is provided according to embodiments of the present application, which includes as follows.

A first vehicle window image in a to-be-processed image is extracted. The first vehicle window image is an image containing color stripes.

The first vehicle window image is input into a pre-trained vehicle window color stripe processing model, and a second vehicle window image output by the pretrained vehicle window color stripe processing model is obtained. The second vehicle window image is an image without color stripe, or the intensity of color stripes in the second vehicle window image is lower than the intensity of the color stripes in the first vehicle window image. The pre-trained vehicle window color stripe processing model is generated by training based on at least two vehicle window sample image pairs, and each of the at least two vehicle window sample image pairs includes a first vehicle window sample image with color stripes and a second vehicle window sample image without color stripe corresponding to the first vehicle window sample image.

In a second aspect, a vehicle window color stripe processing apparatus is further provided according to embodiments of the present application, which includes: a vehicle window image extraction module and a vehicle window image processing module.

The vehicle window image extraction module is configured to extract a first vehicle window image in a to-be-processed image. The first vehicle window image is an image containing color stripes.

The vehicle window image processing module is configured to input the first vehicle window image into a pre-trained vehicle window color stripe processing model and obtain a second vehicle window image output by the pre-trained vehicle window color stripe processing model. The second vehicle window image is an image without color stripe, or an intensity of color stripes in the second vehicle window image is lower than an intensity of the color stripes in the first vehicle window image. The pre-trained vehicle window color stripe processing model is generated by training based on at least two vehicle window sample image pairs, and each vehicle window sample image pair includes a first vehicle window sample image with color stripes and a second vehicle window sample image without color stripe corresponding to the first vehicle window sample image.

In a third aspect, a computer-readable storage medium is provided according to embodiments of the present application. A computer program is stored in the storage medium, and the computer program, when executed by a processor, implements the vehicle window color stripe processing method according to the embodiments of the present disclosure.

In a fourth aspect, an electronic device is provided according to embodiments of the present application. The electronic device includes a memory, a processor, and a computer program stored on the memory and executable by the processor. The processor, when executing the computer program, implements the vehicle window color stripe processing method according to the embodiments of the present disclosure.

DETAILED DESCRIPTION

Figure 1:
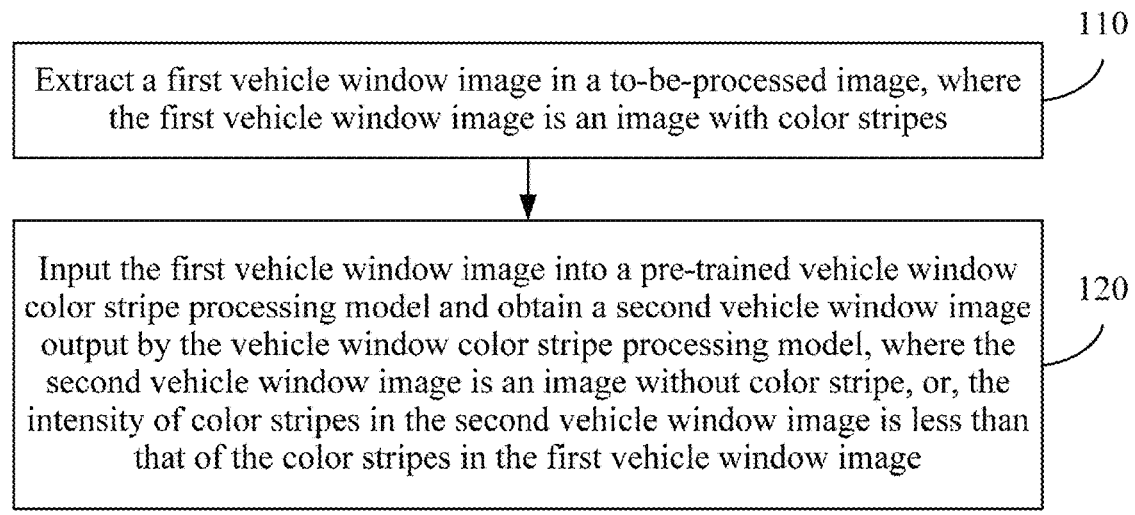
FIG. 1 is a flowchart of a vehicle window color stripe processing method according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; these embodiments are provided merely for the present disclosure to be thoroughly and completely understood. It is to be understood that drawings and embodiments of the present disclosure are merely illustrative and are not intended to limit the scope of the present disclosure.

It is to be understood that the various steps set forth in the method embodiments of the present disclosure may be performed in a different order, and/or in parallel. In addition, the method embodiments may include additional steps and/or omit to perform the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least another embodiment"; and the term "some embodiments" means "at least some embodiments". Related definitions of other terms are given in the description hereinafter.

It is to be noted that references to "first", "second" and the like in the present disclosure are merely intended to distinguish one from another apparatus, module, or unit and are not intended to define the order or interrelationship of the functions performed by these apparatuses, modules, or units.

It is to be noted that references to modifications of "one" or "more/a plurality of/multiple" mentioned in the present disclosure are intended to be illustrative rather than limiting; the person skilled in the art should understand that "one" or "more/a plurality of/multiple" should be understood as "one or more" unless clearly indicated in the context.

The names of messages or information exchanged between multiple apparatuses in embodiments of the present disclosure are only for illustrative purposes rather than being intended to limit the scope of such messages or information.

In related technology, it is possible to cause the color of each color stripe on the vehicle window to produce a corresponding complementary color by rotating the polarizer in the camera by 90 degrees or an integer multiple of 90 degrees within a preset exposure time, so that different colors of lights are superimposed to form white light, thereby eliminating the color stripes in vehicle window images. Although it is theoretically feasible to eliminate color stripes in vehicle window images by controlling the rotation of the polarizer, the specific implementation of this solution requires a large-scale upgrade of the hardware of the current intelligent traffic checkpoint cameras, which does not have the cost advantage.

FIG. 1 is a flowchart of a vehicle window color stripe processing method according to an embodiment of the present disclosure. Vehicle window color stripes may be processed according to the embodiment of the present disclosure. The method may be executed by a vehicle window color stripe processing apparatus. The apparatus may consist of hardware and/or software, and may generally be integrated into an electronic device. As shown in FIG. 1, the method includes the following steps 110 and 120.

In step 110, a first vehicle window image in a to-be-processed image is extracted, where the first vehicle window image is an image containing color stripes.

The to-be-processed image may be an image captured by a monitoring device (such as a front-end camera) at a traffic checkpoint. In the embodiment of the present disclosure, the electronic device identifies a vehicle window area in the to-be-processed image, and extracts a vehicle window image from the to-be-processed image, thereby separating the to-be-processed image into the vehicle window image and a background image. For the convenience of subsequent description, the vehicle window image extracted from the to-be-processed image is referred to as the first vehicle window image. In the embodiment of the present disclosure, the monitoring device is equipped with a polarizer, and generally a film is attached onto the vehicle window glass, therefore, when the monitoring device captures the vehicle, the combination of the polarizer and the vehicle window film causes that the vehicle window portion in the captured to-be-processed image contains color stripes. Therefore, the first vehicle window image extracted from the to-be-processed image is an image containing color stripes.

The electronic device may be a monitoring device (such as a camera) at a traffic checkpoint, a terminal device such as a computer, or a server. It should be noted that the embodiments of the present disclosure do not specifically limit the electronic device. In this embodiment of the present disclosure, in a case where the electronic device is a monitoring device at a traffic checkpoint, and when the monitoring device captures the to-be-processed image, the color stripes in the vehicle window image in the to-be-processed image may be directly processed. In a case where the electronic device is a terminal device or a server, the electronic device obtains the to-be-processed image sent by the monitoring device, and then processes the color stripes in the vehicle window image in the to-be-processed image.

In step 120, the first vehicle window image is input into a pre-trained vehicle window color stripe processing model, and a second vehicle window image output by the pretrained vehicle window color stripe processing model is obtained, where the second vehicle window image is an image without color stripe, or the intensity of color stripes in the second vehicle window image is lower than the intensity of the color stripes in the first vehicle window image.

The pre-trained vehicle window color stripe processing model is generated by training based on at least two vehicle window sample image pairs, and the vehicle window sample image pair includes a first vehicle window sample image with color stripes and a second vehicle window sample image without color stripe corresponding to the first vehicle window sample image.

The vehicle window color stripe processing model is a machine learning model that may quickly and accurately eliminate or weaken the color stripes in vehicle window images.

In an embodiment, the method further includes acquiring the vehicle window color stripe processing model including: acquiring a training sample set, where the training sample set includes at least two vehicle window sample image pairs, and the vehicle window sample image pair includes a vehicle window sample image with color stripes and a vehicle window sample image without color stripe corresponding to the vehicle window sample image with color stripes; and training a preset machine learning model based on the training sample set to generate the vehicle window color stripe processing model.

The intensity of the color stripes refers to how obvious the color stripes are.

In this embodiment of the present disclosure, a training sample set including at least two window sample image pairs is acquired, and each vehicle window sample image pair includes a vehicle window sample image with color stripes and a vehicle window sample image without color stripe. The vehicle window sample image without color stripe may be a vehicle window image in which the color stripes have been eliminated after the vehicle window sample image with color stripes is processed. The preset machine learning model is trained based on the training sample set until the loss function converges, and the trained machine learning model is used as the vehicle window color stripe processing model. In the process of training the preset machine learning model based on the training sample set, there is no restriction on the selection of loss function and optimizer, for example, L1 loss and Adam optimizer may be used. In each training iteration, random cropping, flipping, and rotation may be adopted to randomly enhance the data, and the specific training method is not limited, for example, reference may be made to the general training strategy of deep learning. It is to be noted that in order to improve the training accuracy of the vehicle window color stripe processing model, the vehicle window sample image pairs in the training sample set may be images taken in different scenes.

The preset machine learning model is just a deep learning model. Currently, deep learning models are not only used in high-level visual fields, such as face recognition, vehicle license plate detection, etc., commonly used models are for example, visual geometry group (VGG), ResNet, single shot multiBox detector (SSD); deep learning models are but also increasingly used in low-level vision fields, such as image restoration, noise reduction and other tasks, commonly used models are, for example, U-net, context aggregation network (CAN), etc. Because the model needs to obtain full resolution images when processing low-level visual tasks, the fully convolutional network (FCN) is a relatively good choice. On this basis, the performance of the FCN model on low-level visual tasks can be improved by, for example, adding skip connections, downsampling-upsampling symmetric structures.

Figure 2:
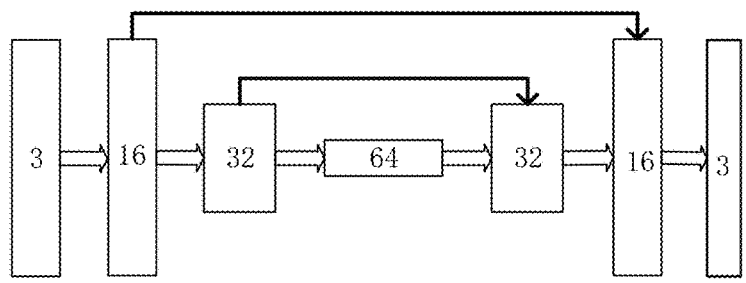
FIG. 2 is a structural block diagram of a vehicle window color stripe processing model according to an embodiment of the present disclosure.

For example, the preset machine learning model is FCN, and in the embodiment of the present disclosure, there is no limit on the number of model layers and the number of convolution kernels in the FCN model. FIG. 2 is a structural block diagram of a vehicle window color stripe processing model according to an embodiment of the present disclosure. As shown in FIG. 2, the vehicle window color stripe processing model contains six convolution modules. Each arrow (the wide arrow from the left to the right in FIG. 2) represents a convolution module, and each box represents a feature layer, the number in the block indicates the number of channels of the feature layer, and the convolution kernel size may be 3×3. In the order from left to right, the first two convolution modules are each composed of one convolution layer and one max-pooling layer, the third convolution module and the sixth convolution module each contain only one convolution layer, and the fourth convolutional module and the fifth convolutional module are each composed of one de-convolution layer and one convolutional layer. The input and output of the vehicle window color stripe processing model are both red green blue (RGB) data, and the dimensions of the input data and output data are both: H×W×3 (H and W represent the height and width of the vehicle window image respectively). As shown in FIG. 2, the dimensions of data output by the first convolution module are H/2×W/2×16; the dimensions of data output by the second convolution module are H/4×W/4×32; the dimensions of data output by the third convolution module are H/4×W/4×64; the fourth convolution module contains the de-convolution layer, accepts the data output by the second convolution module (skip connection) and the third convolution module as input, and outputs the data having dimensions of H/2×W/2×32; the fifth convolution module contains the de-convolution layer and accepts the data output by the first convolution module (skip connection) and the fourth convolution module as input, and outputs the data having dimensions of H×W×16; and the dimensions of the data output by the sixth convolution module are H×W×3.

In the embodiment of the present disclosure, a first vehicle window image is input into a pre-trained vehicle window color stripe processing model, to allow the vehicle window color stripe processing model to analyze the first vehicle window image, and process color stripes in the first vehicle window image based on an analysis result, to eliminate or weaken the color stripes in the first vehicle window image. An output result of the vehicle window color stripe processing model is obtained. Since the vehicle window color stripe processing model is an end-to-end machine learning model, the output result is an image corresponding to the first vehicle window image. The image output by the pretrained vehicle window color stripe processing model is taken as the second vehicle window image. There is no color stripe in the second vehicle window image, or the intensity of color stripes in the second vehicle window image is lower than the intensity of the color stripes in the first vehicle window image.

It can be understood that in the embodiment of the present disclosure, through the vehicle window color stripe processing model, a vehicle window image with color stripes may be mapped to a vehicle window image without color stripe or a vehicle window image with color stripes having lower intensity.

A vehicle window color stripe processing method is provided according to an embodiment of the present disclosure. In the method, a first vehicle window image in a to-be-processed image is extracted. The first vehicle window image is an image containing color stripes. The first vehicle window image is input into a pre-trained window color stripe processing model, and a second vehicle window image output by the pretrained vehicle window color stripe processing model is obtained. The second vehicle window image is an image without color stripe, or the intensity of color stripes in the second vehicle window image is lower than the intensity of the color stripes in the first vehicle window image. In the embodiment of the present disclosure, the vehicle window image containing color stripes is processed through the vehicle window color stripe processing model, which can effectively reduce or eliminate the color stripes in the vehicle window image, and facilitate reducing the interference of the color stripes on the intelligent recognition function, thereby improving the face recognition rate.

In some embodiments, the acquiring a training sample set includes: acquiring at least two vehicle sample image pairs by means of an image acquisition apparatus, where each vehicle sample image pair includes a first vehicle sample image and a second vehicle sample image, the first vehicle sample image includes a vehicle window image with color stripes, and the second vehicle sample image includes a vehicle window image without color stripe; performing pixel matching on the first vehicle sample image and the second vehicle sample image in each of the at least two vehicle sample image pairs; performing vehicle window detection on a pixel-matched first vehicle sample image and a pixel-matched second vehicle sample image; and based on a vehicle window detection result, extracting a vehicle window image with color stripes from the pixel-matched first vehicle sample image, and extracting a vehicle window image without color stripe from the pixel-matched second vehicle sample image; taking the vehicle window image with color stripes extracted and the vehicle window image without color stripe extracted as a vehicle window sample image pair in the training sample set. This setting can not only quickly and accurately acquire multiple vehicle window sample image pairs, but also improve the training accuracy of the vehicle window color stripe processing model, thereby facilitating improvement of effect of processing color stripes in the vehicle window images by the vehicle window color stripe processing model.

Figure 3A:
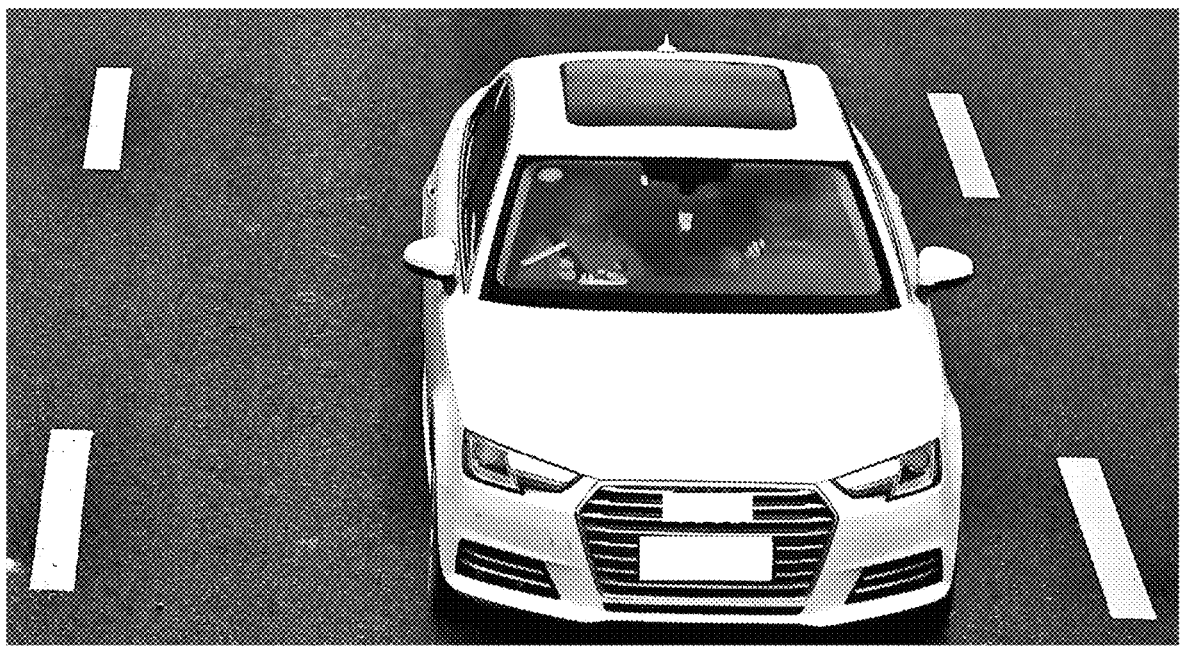
FIG. 3A is an image captured under a weak brightness of a flashlight and a long exposure time of an image sensor according to an embodiment of the present disclosure.
Figure 3B:
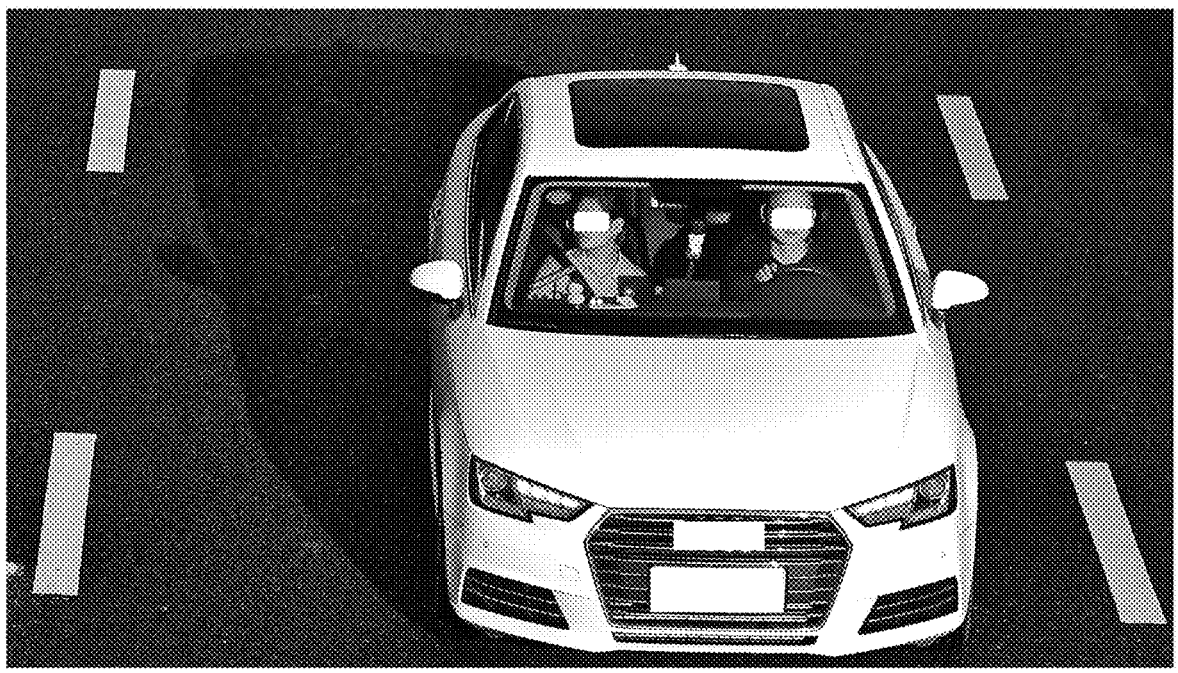
FIG. 3B is an image captured under a strong brightness of a flashlight and a short exposure time of an image sensor according to an embodiment of the present disclosure.

The applicant discovered in engineering practice that color stripes in vehicle window images of filmed vehicle windows captured by monitoring devices (such as cameras) in night scenes are significantly weakened or even invisible. By comparing the differences between nighttime capture scenes and daytime capture scenes, it is found that the main difference lies in the intensity of sunlight. The lower the ratio of light intensity of sunlight and its refraction and reflection to the intensity of fill light of the flashlight, the weaker the intensity of color stripes in the vehicle window images taken; the higher the ratio of light intensity of sunlight and its refraction and reflection to the intensity of fill light of the flashlight, the stronger the intensity of color stripes in the vehicle window images. That is, the stronger the intensity of ambient light and the weaker the intensity of fill light of flashlight, the more obvious the color stripes in the vehicle window image; conversely, the weaker the intensity of ambient light and the stronger the intensity of fill light of flashlight, the less obvious the color stripes in the vehicle window image. Therefore, the ratio of the light intensity of sunlight and its refraction and reflection to the intensity of fill light of flashlight can be reduced by increasing the peak power of the flashlight in the monitoring device and reducing the exposure time of the image sensor (that is, the optical sensor), so as to weaken color stripes in the vehicle window image. The peak power of the flashlight can be understood as the flash brightness per unit time. The greater the peak power of the flashlight, the stronger the brightness of the flashlight; the shorter the exposure time of the image sensor, the lower the accumulated ambient light brightness. However, due to the shortened exposure time and the limited range of fill light of flashlight, the overall brightness of the captured image becomes low, which is apt to giving people the illusion that the image brightness does not match the brightness of the practical ambient light. Illustratively, FIG. 3A is an image captured under a weak brightness of a flashlight and a long exposure time of an image sensor according to an embodiment of the present disclosure; FIG. 3B is an image captured under a strong brightness of a flashlight and a short exposure time of an image sensor according to an embodiment of the present disclosure. The overall brightness of the image in FIG. 3A is relatively uniform and can accurately reflect the practical shooting environment. However, the color stripes in the vehicle window image in FIG. 3A are obvious and the face image cannot be accurately recognized. In the image in FIG. 3B, the brightness of the vehicle body part is brighter, and there are no obvious color stripes in the vehicle window image, the face image can be accurately recognized, but the overall brightness of the image in other background areas outside the vehicle body is darker, which is apt to making people think that the brightness of the captured image does not match the brightness of the practical ambient, resulting in poor user experience. Therefore, although simply increasing the peak power of the flashlight in the monitoring device and reducing the exposure time of the image sensor in the monitoring device may weaken the color stripes in the vehicle window image, there are still certain drawbacks in practical applications. Especially based on the high requirements for image quality of intelligent traffic capture cameras, if the advantages of the two types of images in FIG. 3A and FIG. 3B may be combined, the product competitiveness of the capture cameras will be greatly improved.

In some embodiments, at least two vehicle sample image pairs in different scenes are acquired by means of an image acquisition apparatus. Each vehicle sample image pair includes a first vehicle sample image containing a vehicle window image with color stripes and a second vehicle sample image containing a vehicle window image without color stripe. In some embodiments, the acquiring at least two vehicle sample image pairs by means of an image acquisition apparatus includes: based on a preset control condition, acquiring the first vehicle sample image through a first image acquisition module in an image acquisition apparatus, and also acquiring the second vehicle sample image through a second image acquisition module in the image acquisition apparatus. Illustratively, the image acquisition apparatus may include two image acquisition modules, and each of the two image acquisition modules includes a flashlight, a lens, an image sensor and an image processing module. The flashlight in one image acquisition module (may be referred to as the first image acquisition module) is an ordinary flashlight, and the flashlight in the other image acquisition module (which may be referred to as the second image acquisition module) is a flashlight with high peak brightness and short discharge time. Illustratively, the image processing module may be implemented with either software or hardware, as long as it may implement conventional image processing functions. If the image processing module is implemented in the form of hardware, the hardware type may be but is not limited to a field programmable gate array (FPGA, a programmable logic device) chip with an image processing program or an application specific integrated circuit (ASIC) chip with an image processing unit. Illustratively, the image processing module in the first image acquisition module may control the corresponding image sensor to work in a long exposure time and low gain mode through an exposure algorithm, and combine with the discharge of an ordinary flashlight, so that the output of the image sensor in the first image acquisition module is the first vehicle sample image (for example, the image in FIG. 3A);

and the image processing module in the second image acquisition module may control the corresponding image sensor to work in a short exposure time and high gain mode through an exposure algorithm, and combine with the discharge of a flashlight having high peak brightness and short discharge time, so that the output of the image sensor in the second image acquisition module is the second vehicle sample image (for example, the image in FIG. 3B). In the embodiment of the present disclosure, due to the difference in the physical positions of the image sensors in the two image acquisition modules, the practically acquired first vehicle sample image and second vehicle sample image do not completely overlap, so the first vehicle sample image and the second vehicle sample image may be matched at the pixel level. The pixel matching between the first vehicle sample image and the second vehicle sample image may be performed based on a feature matching (such as scale-invariant feature transform (SIFT)) algorithm. It is to be noted that the embodiments of the present disclosure do not limit the pixel matching method. Then window detection is performed on a pixel-matched first vehicle sample image and a pixel-matched second vehicle sample image, to determine coordinates of the vehicle window areas in the pixel-matched first vehicle sample image and the pixel-matched second vehicle sample image respectively, and vehicle window images are extracted from the pixel matched vehicle sample images respectively according to the coordinates of the vehicle window areas. The vehicle window image extracted from the pixel-matched first vehicle sample image is a vehicle window image with color stripes, and the vehicle window image extracted from the pixel-matched second vehicle sample image is a vehicle window image without color stripe. The vehicle window image with color stripes extracted and the vehicle window image without color stripe extracted are taken as a vehicle window sample image pair in the training sample set. The vehicle window image with color stripes and the vehicle window image without color stripe are of the same size.

Figure 4:
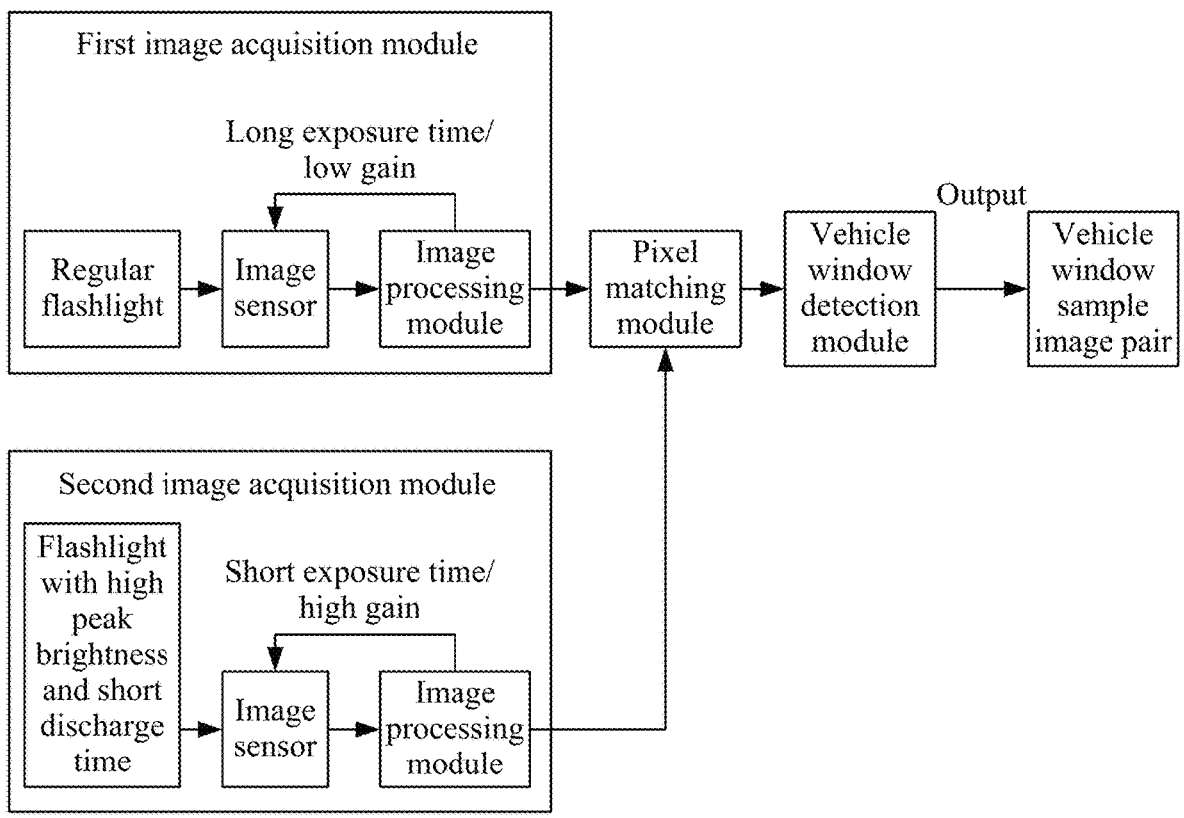
FIG. 4 is a schematic structural diagram of an image acquisition apparatus according to an embodiment of the present disclosure.

It is to be noted that the pixel matching operation and the vehicle window detection operation on the vehicle sample image pair may be performed by an electronic device or by an image acquisition apparatus. In a case where the pixel matching operation and the vehicle window detection operation are performed by an image acquisition apparatus, the image acquisition apparatus may not only include two image acquisition modules, but also include a pixel matching module and a vehicle window detection module. Illustratively, FIG. 4 is a schematic structural diagram of an image acquisition apparatus according to an embodiment of the present disclosure.

In an embodiment, the pixel matching module and the vehicle window detection module may be implemented as software or hardware, as long as they may realize the conventional above-mentioned functions. If the pixel matching module and the vehicle window detection module are implemented in the form of hardware, the hardware type may be an FPGA chip with the above functions or an ASIC chip with an image processing unit or a digital signal processor (DSP) chip with the above-mentioned functions.

In some embodiments, the method further includes acquiring the at least two vehicle window sample image pairs including: based on a preset control condition, acquiring the first vehicle window sample image by a first image acquisition module in an image acquisition apparatus, and acquiring the second vehicle window sample image by a second image acquisition module in the image acquisition apparatus.

In some embodiments, the first image acquisition module includes a first flashlight and a first image sensor; the second image acquisition module includes a second flashlight and a second image sensor. A flash peak brightness of the second flashlight is greater than a flash peak brightness of the first flashlight, and a discharge time of the second flashlight is less than a discharge time of the first flashlight. The preset control condition includes: when a flash duration of the first flashlight reaches a first preset time, the first image sensor starts exposure; and when the exposure of the first image sensor ends, the second flashlight starts to flash, and when a flash duration of the second flashlight reaches a second preset time, the second image sensor starts exposure. With this setting, the quality of the acquired vehicle sample image pair may be improved, especially the quality of the vehicle sample image containing a vehicle window image without color stripe may be improved.

In the embodiment of the present disclosure, the greater the peak power of the flashlight, the greater the peak brightness of the flashlight, and correspondingly, the greater the intensity of fill light of the flashlight. The peak brightness of the flashlight may be understood as the maximum brightness of the flashlight. By using a flashlight with a large peak brightness to fill light, the ratio of the intensity of sunlight and its refraction and reflection light to the intensity of the fill light of the flashlight may be effectively reduced in shooting images. When the discharge time of the flashlight is shorter, the flash time of the flashlight is shorter. By filling light with a flashlight having a short discharge time and shortening the exposure time of the second image sensor, the difference between the images of the moving object acquired by the first image sensor and the second image sensor may be reduced.

In the embodiment of the present disclosure, when to acquire the first vehicle sample image by the first image acquisition module in the image acquisition apparatus and acquire the second vehicle sample image by the second image acquisition module in the image acquisition apparatus, the first flashlight starts to flash in response to the image acquisition event being triggered. Since the brightness of the flashlight is low when the flashlight is first started, the first image sensor starts the exposure after a delay, that is, when the first flashlight flashes for a first preset time, the first image sensor starts exposure. The first preset time may be understood as a delayed exposure time of the first image sensor, and the first preset time may be set manually based on experience. When the exposure of the first image sensor ends, the second flashlight starts to flash. When the second flashlight starts to flash, the first flashlight may continue to flash or may stop flashing. In the embodiment of the present disclosure, the working status of the first flashlight when the second flashlight starts to flash is not limited. Similarly, since the brightness of the second flashlight is low when the second flashlight is first started, the second image sensor starts exposure when the second flashlight flashes for a second preset time which may be understood as a delayed exposure time of the second image sensor, and the second preset time may also be set manually based on experience.

Figure 5:
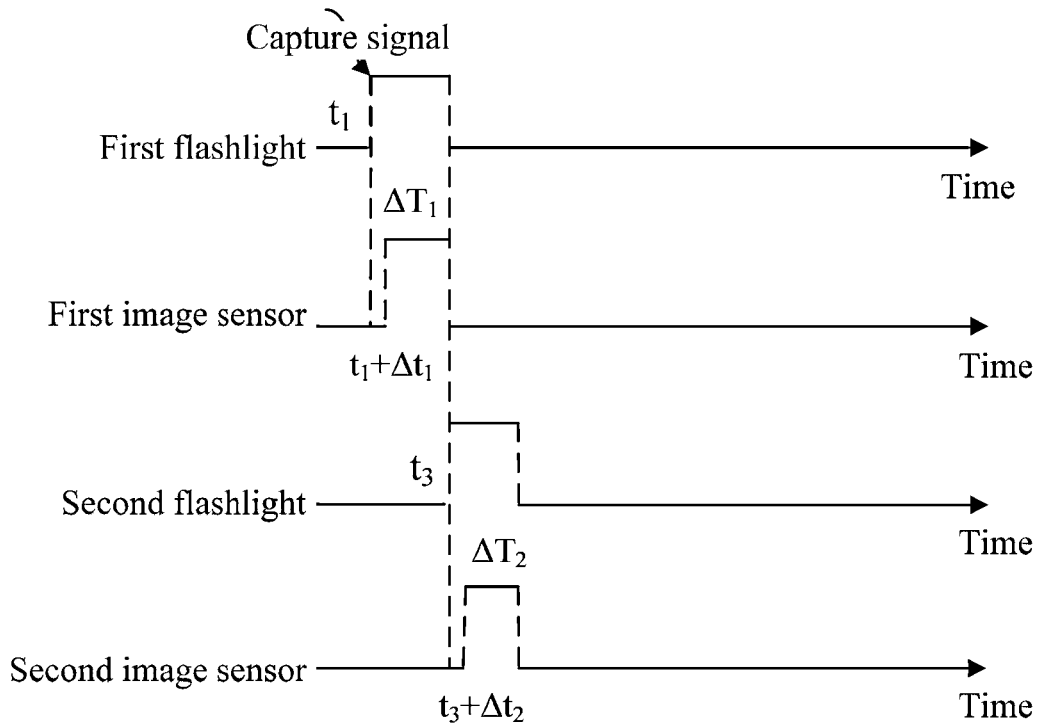
FIG. 5 is a schematic diagram showing a timing control of a flashlight and an image sensor according to an embodiment of the present disclosure.

In an embodiment, FIG. 5 is a schematic diagram of a timing control of a flashlight and an image sensor according to an embodiment of the present disclosure. In order to stagger the flash timings of the first flashlight and the second flashlight and prevent the adding of brightnesses of the flashlights, the preset control condition provided by the embodiment of the present disclosure satisfies the timing control conditions shown in FIG. 5. As shown in FIG. 5, when the image acquisition apparatus receives a capture instruction at a time instant $t_1$, the first flashlight starts to flash; and when the flash duration of the first flashlight reaches a first preset time $\Delta t_1$, the first image sensor starts exposure, that is, the first image sensor starts exposure at $t_1+\Delta t_1$, and the exposure duration of the first image sensor is $\Delta T_1$. The second flashlight starts to flash when the exposure of the first image sensor ends, that is, at a time instant of $t_3=t_1+\Delta t_1+\Delta T_1$. The second image sensor starts exposure after the second flashlight flashes for a second preset time $\Delta t_2$, that is, the second image sensor starts exposure at a time instant $t_3+\Delta t_2$, and the exposure duration of the second image sensor is $\Delta T_2$.

In the embodiment of the present disclosure, in order to minimize the proportion of sunlight in the light-sensing time of the image sensor (the light received by the image sensor generally comes from two parts, namely sunlight and fill light of flashlight; the proportion of sunlight may refer to, sunlight intensity/(sunlight intensity+flash intensity)), so as to obtain an image without color stripe, the following three methods may be used: reducing the exposure time of the image sensor/shortening the discharge time of the flashlight, increasing the peak power of the flashlight, and shifting the exposure time of the sensor to be within a time period while the flash brightness of the flashlight is higher than the ambient brightness. Therefore, the preset control condition further includes that an exposure time of the first image sensor and an exposure time of the second image sensor, and the gain of the first image sensor and the gain of the second image sensor satisfy a preset relationship condition. The preset relationship condition includes:

$$\Delta T_2 = \Delta T_1/N$$
$$\Delta T_2 = \min(\Delta T_2, t_2 - \Delta t_2)$$
$$G_2 = \Delta T_1 \times G_1/\Delta T_2$$

where, $$\Delta t_2 = \frac{M}{(\Delta T_1 \times G_1)}$$
$$\Delta t_2 = \min(\Delta t_2, t_2)$$

where, $\Delta T_1$ represents the exposure time of the first image sensor, $\Delta T_2$ represents the exposure time of the second image sensor, $G_1$ represents the gain of the first image sensor, $G_2$ represents the gain of the second image sensor, and $\Delta t_2$ represents the second preset time; $t_2$ represents an effective discharge time of the second flashlight, M represents a first preset constant, and N represents a second preset constant.

The exposure time $\Delta T_1$ of the first image sensor may be realized based on a conventional automatic exposure control algorithm, for example, an average brightness of the picture is used as statistical information, an exposure target value is preset, and the brightness statistical information obtained in real time is smoothly converged to the exposure target value by means such as adjusting the shutter/gain. For a certain stationary flashlight, its effective discharge time is fixed. In addition, N>1, N may be adaptively adjusted according to the degree of noise of image acquired by the second image sensor. When the image noise is more obvious, the N is smaller. It is to be noted that when the product of the exposure time and gain of the image sensor is larger, the ambient brightness is lower; and conversely, when the product of the exposure time and gain of the image sensor is smaller, the ambient brightness is higher.

In some embodiments, the preset time is determined by at least one of the following means: acquiring a first ambient light brightness, and according to the first ambient light brightness and a preset positive proportional relationship between ambient light brightnesses and preset times, determining a preset time corresponding to the first ambient light brightness. When the ambient light brightness is greater, the preset time is longer; or, acquiring a second ambient light brightness and a brightness graph of a flashlight, and according to the second ambient light brightness and the brightness graph of the flashlight, determining a preset time corresponding to the flashlight. When a flash duration of the flashlight reaches a corresponding preset time, the brightness of the flashlight is greater than or equal to the second ambient light brightness.

In the embodiment of the present disclosure, the means for determining the preset time includes the means for determining the first preset time and the second preset time. The delayed exposure time of the image sensor is positively proportional to the ambient light brightness, therefore, when to determine the preset time, an ambient light brightness may be obtained; and according to the ambient light brightness and a preset positive proportional relationship between ambient light brightnesses and preset times, a preset time corresponding to the ambient light brightness is calculated. When the brightness of the ambient light is greater, the preset time is longer; and conversely, when the brightness of the ambient light is smaller, the preset time is shorter. It is to be noted that in determining the first preset time and the second preset time, the corresponding positive proportional relationships are different. The ratio of the ambient light brightness to the first preset time is greater than the ratio of the ambient light brightness to the second preset time.

Figure 6A:
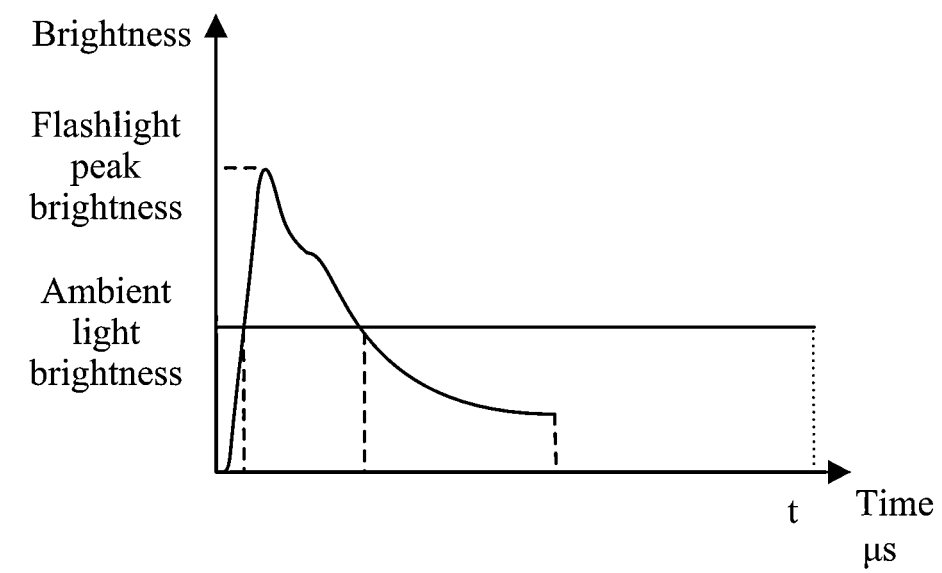
FIG. 6A is a schematic diagram of brightness changes of an ordinary flashlight according to an embodiment of the present disclosure.
Figure 6B:
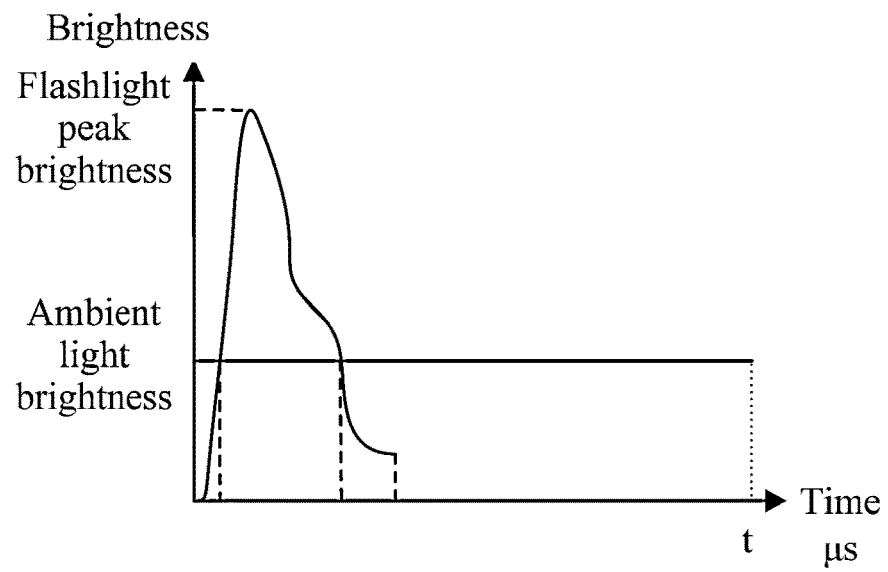
FIG. 6B is a schematic diagram of brightness changes of a flashlight with high peak brightness and short discharge time according to an embodiment of the present disclosure.

Illustratively, the preset time may also be determined based on the ambient light brightness and the brightness graph of the flashlight. FIG. 6A is a schematic diagram of brightness changes of an ordinary flashlight according to an embodiment of the present disclosure. FIG. 6B is a schematic diagram of brightness changes of a flashlight with high peak brightness and short discharge time according to an embodiment of the present disclosure. During the discharge time of the flashlight (generally, at the level of hundreds of s), the sunlight illumination remains basically unchanged. Therefore, the ambient light brightness during the discharge time of the flashlight may be considered to be constant. As shown in FIG. 6A and FIG. 6B, when the image sensor delays exposure for a preset duration, the brightness of the flashlight is greater than the current ambient light brightness.

In some embodiments, after the obtaining a second vehicle window image output by the pretrained vehicle window color stripe processing model, the method further includes: fusing the second vehicle window image with a background image in the to-be-processed image, to generate a target image. The to-be-processed image includes the background image and the first vehicle window image. In the embodiment of the present disclosure, the to-be-processed image includes the first vehicle window image and the background image, and the background image may be understood as the image in the to-be-processed image except the first vehicle window image. Fusing the second vehicle window image with the background image in the to-be-processed image may also be understood as covering or replacing the first vehicle window image with the second vehicle window image, thereby generating a target image. There is no color stripe in the vehicle window image contained in the target image, or the intensity of color stripes in the vehicle window image contained in the target image is lower than the intensity of the color stripes in the vehicle window image contained in the to-be-processed image.

Figure 7:
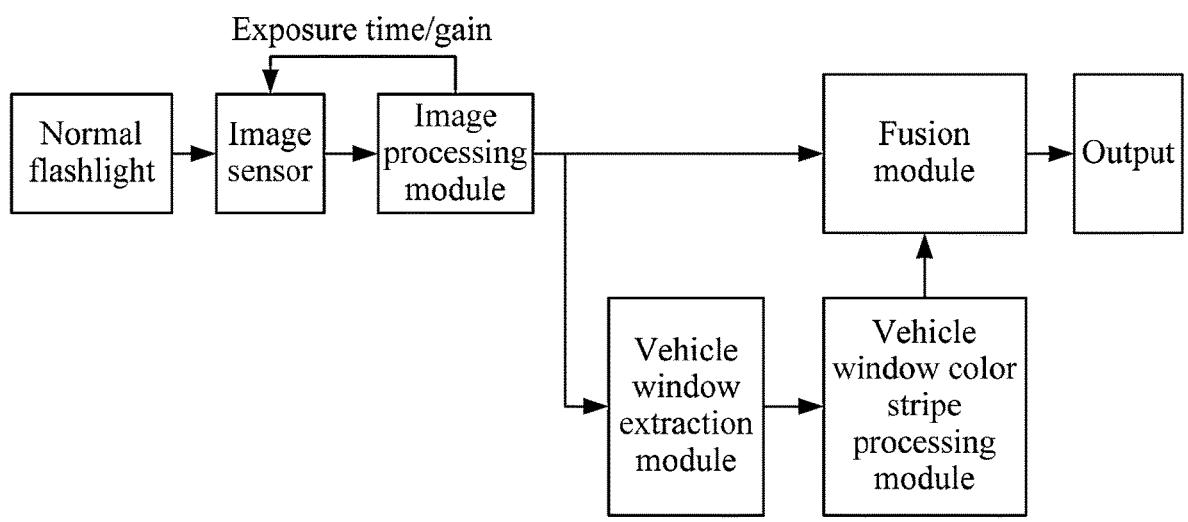
FIG. 7 is a schematic diagram showing the process of processing vehicle window color stripes based on the vehicle window color stripe processing model according to an embodiment of the present disclosure.

FIG. 7 is a schematic diagram showing the process of processing vehicle window color stripes based on the vehicle window color stripe processing model according to an embodiment of the present disclosure.

Figure 8:
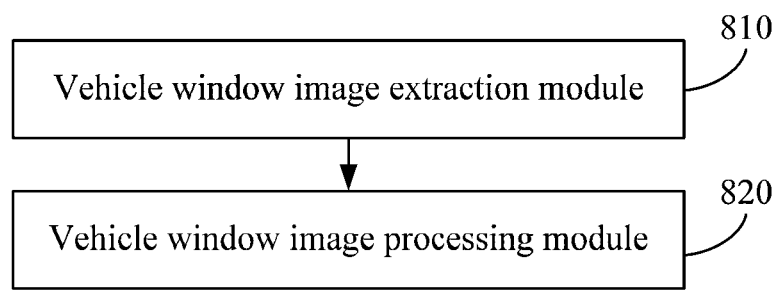
FIG. 8 is a schematic structural diagram of a vehicle window color stripe processing apparatus according to an embodiment of the present disclosure.

FIG. 8 is a schematic structural diagram of a vehicle window color stripe processing apparatus according to an embodiment of the present disclosure. As shown in FIG. 8, the apparatus includes: a vehicle window image extraction module 810 and a vehicle window image processing module 820. The vehicle window image extraction module 810 is configured to extract a first vehicle window image in a to-be-processed image. The first vehicle window image is an image containing color stripes.

The vehicle window image processing module 820 is configured to input the first vehicle window image into a pre-trained vehicle window color stripe processing model and obtain a second vehicle window image output by the pretrained vehicle window color stripe processing model. The second vehicle window image is an image without color stripe, or the intensity of color stripes in the second vehicle window image is lower than the intensity of the color stripes in the first vehicle window image. The pre-trained vehicle window color stripe processing model is generated by training based on at least two vehicle window sample image pairs, and each vehicle window sample image pair includes a first vehicle window sample image with color stripes and a second vehicle window sample image without color stripe corresponding to the first vehicle window sample image.

A vehicle window color stripe processing apparatus is provided according to an embodiment of the present disclosure, which is configured to extract a first vehicle window image in a to-be-processed image, where the first vehicle window image is an image containing color stripes; input the first vehicle window image into a pre-trained window color stripe processing model, and obtain a second vehicle window image output by the pretrained vehicle window color stripe processing model, where the second vehicle window image is an image without color stripe, or the intensity of color stripes in the second vehicle window image is lower than the intensity of the color stripes in the first vehicle window image. The pre-trained vehicle window color stripe processing model is generated by training based on at least two vehicle window sample image pairs, and each vehicle window sample image pair includes a first vehicle window sample image with color stripes and a second vehicle window sample image without color stripe corresponding to the first vehicle window sample image. In the embodiment of the present disclosure, the vehicle window image containing color stripes is processed through the vehicle window color stripe processing model, which may effectively reduce or eliminate the color stripes in the vehicle window image, and facilitate reducing the interference of the color stripes on the intelligent recognition function, thereby improving the face recognition rate.

In an embodiment, the apparatus further includes a sample set acquisition module, and the sample set acquisition module is configured to acquire the at least two vehicle window sample image pairs.

The sample set acquisition module includes: a vehicle image pair acquisition unit, a pixel matching unit, a vehicle window image detection unit and a vehicle window image pair acquisition unit.

The vehicle image pair acquisition unit is configured to acquire at least two vehicle sample image pairs by means of an image acquisition apparatus, where each vehicle sample image pair includes a first vehicle sample image and a second vehicle sample image, the first vehicle sample image includes a vehicle window image with color stripes, and the second vehicle sample image includes a vehicle window image without color stripe.

The pixel matching unit is configured to perform pixel matching on the first vehicle sample image and the second vehicle sample image in each of the at least two vehicle sample image pairs.

The vehicle window image detection unit is configured to perform vehicle window detection on a pixel-matched first vehicle sample image and a pixel-matched second vehicle sample image, and based on a vehicle window detection result, extract a vehicle window image with color stripes from the pixel-matched first vehicle sample image, and extract a vehicle window image without color stripe from the pixel-matched second vehicle sample image.

The vehicle window image pair acquisition unit is configured to take the vehicle window image with color stripes extracted and the vehicle window image without color stripe extracted as a vehicle window sample image pair in the training sample set.

In an embodiment, the sample set acquisition module is configured to: based on a preset control condition, acquiring the first vehicle sample image by a first image acquisition module in an image acquisition apparatus, and acquiring the second vehicle sample image by a second image acquisition module in the image acquisition apparatus.

In an embodiment, the first image acquisition module includes a first flashlight and a first image sensor; and the second image acquisition module includes a second flashlight and a second image sensor. A flash peak brightness of the second flashlight is greater than a flash peak brightness of the first flashlight, and a discharge time of the second flashlight is less than a discharge time of the first flashlight.

The preset control condition includes: in response to a flash duration of the first flashlight reaching a first preset time, the first image sensor starts exposure; in response to the exposure of the first image sensor ending, the second flashlight starts to flash; and in response to a flash duration of the second flashlight reaching a second preset time, the second image sensor starts exposure.

In an embodiment, the preset control condition further includes: an exposure time of the first image sensor and an exposure time of the second image sensor, and a gain of the first image sensor and a gain of the second image sensor satisfy a preset relationship condition.

The preset relationship condition includes:

$$\Delta T_2 = \Delta T_1 / N$$

$$\Delta T_2 = \min(\Delta T_2, t_2 - \Delta t_2)$$

$$G_2 = \frac{\Delta T_1 \times G_1}{\Delta T_2}$$

where, $$\Delta t_2 = \frac{M}{(\Delta T_1 \times G_1)}$$

$$\Delta t_2 = \min(\Delta t_2, t_2)$$

where, $\Delta T_1$ represents the exposure time of the first image sensor, $\Delta T_2$ represents the exposure time of the second image sensor, $G_1$ represents the gain of the first image sensor, $G_2$ represents the gain of the second image sensor, and $\Delta t_2$ represents the second preset time; $t_2$ represents an effective discharge time of the second flashlight, M represents a first preset constant, and N represents a second preset constant.

In an embodiment, the preset time is determined by at least one of the following means.

A first ambient light brightness is acquired, and according to the first ambient light brightness and a preset positive proportional relationship between ambient light brightnesses and preset times, a preset time corresponding to the first ambient light brightness is determined. When the ambient light brightness is greater, the preset time is longer.

Alternatively, a second ambient light brightness and a brightness graph of a flashlight are acquired, and according to the second ambient light brightness and the brightness graph of the flashlight, a preset time corresponding to the flashlight is determined. When a flash duration of the flashlight reaches a corresponding preset time, the brightness of the flashlight is greater than or equal to the second ambient light brightness.

In an embodiment, the apparatus further includes: an image fusion module.

The image fusion module is configured to, after a second vehicle window image output by the pretrained vehicle window color stripe processing model is obtained, fuse the second vehicle window image with a background image in the to-be-processed image, to generate a target image. The to-be-processed image includes the background image and the first vehicle window image.

The above-described apparatus can execute the methods provided by all the foregoing embodiments of the present disclosure, and has corresponding functional modules for executing the above-described methods and can achieve corresponding beneficial effects. For technical details not exhaustively described in the embodiments of the present disclosure, reference may be made to the methods provided in all the foregoing embodiments of the present disclosure.

A storage medium containing computer-executable instructions is further provided according to the embodiments of the present disclosure, the computer-executable instructions are configured to execute the vehicle window color stripe processing method according to the embodiments of the present disclosure.

Storage media may be any various types of memory devices or storage devices. The term "storage medium" is intended to include: an installation medium, such as a compact disc read-only memory (CD-ROM), a floppy disk, or a tape apparatus; a computer system memory or random access memory, such as a dynamic random access memory (DRAM), a double data rate random access memory (DDR RAM), a static random access memory (SRAM), an extended data output random access memory (EDO RAM), a Rambus (RAM), etc.; a non-volatile memory, such as a flash memory, magnetic media (for example, a hard disk or optical storage); a register or other similar types of memory elements, etc. The storage medium may further include other types of memory or combinations thereof. In addition, the storage medium may be located in a first computer system in which a program is executed, or may be located in a different second computer system connected to the first computer system through a network such as the Internet. The second computer system may provide program instructions to the first computer for execution. The term "storage medium" may include two or more storage media that may reside in different locations, such as in different computer systems connected by a network. A storage medium may store program instructions (e.g., implemented as a computer program) executable by one or more processors.

The storage medium may be a non-transitory storage medium.

In a storage medium containing computer-executable instructions according to an embodiment of the present disclosure, the computer-executable instructions are not limited to perform the above-described vehicle window color stripe processing operations, but can also perform related operations in the vehicle window color stripe processing method according to any embodiment of the present disclosure.

Figure 9:
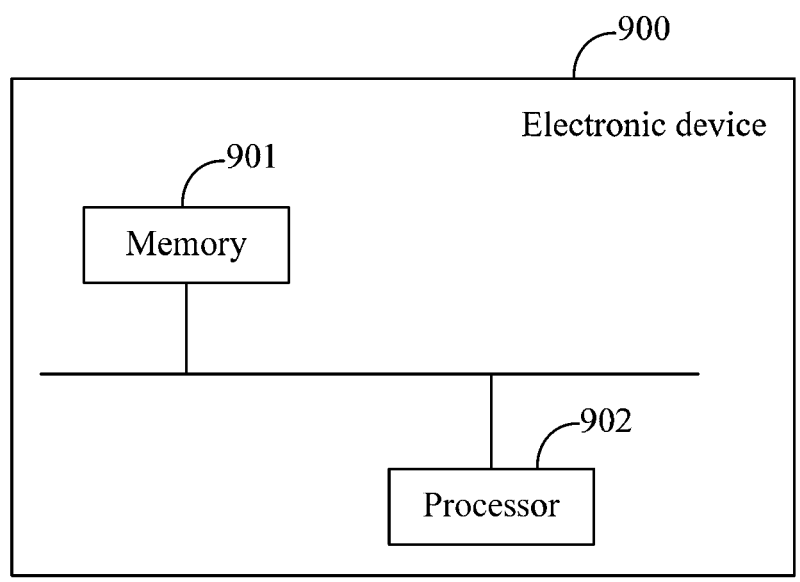
FIG. 9 is a schematic structural diagram of an electronic device according to an embodiment of the present disclosure.

An electronic device is provided according to an embodiment of the present disclosure, in which the vehicle window color stripe processing apparatus according to the embodiment of the present disclosure may be integrated. FIG. 9 is a structural block diagram of an electronic device according to an embodiment of the present disclosure. The electronic device 900 may include: a memory 901, a processor 902, and a computer program stored on the memory 901 and executable on the processor 902. The processor 902, when executing the computer program, implements the vehicle window color stripe processing method according to the embodiment of the present disclosure.

The electronic device according to the embodiment of the present disclosure is configured to extract a first vehicle window image in the to-be-processed image, where the first vehicle window image is an image containing color stripes; input the first vehicle window image into a pre-trained vehicle window color stripe processing model and obtain a second vehicle window image output by the pretrained vehicle window color stripe processing model, where the second vehicle window image is an image without color stripe, or the intensity of color stripes in the second vehicle window image is lower than the intensity of the color stripes in the first vehicle window image. The pre-trained vehicle window color stripe processing model is generated by training based on at least two vehicle window sample image pairs, and each vehicle window sample image pair includes a first vehicle window sample image with color stripes and a second vehicle window sample image without color stripe corresponding to the first vehicle window sample image. In the embodiment of the present disclosure, the vehicle window image containing color stripes is processed through the vehicle window color stripe processing model, which can effectively reduce or eliminate the color stripes in the vehicle window image, and facilitate reducing the interference of the color stripes on the intelligent recognition function, thereby improving the face recognition rate.

The vehicle window color stripe processing apparatus, the storage medium, and the electronic device according to the above embodiments can execute the vehicle window color stripe processing method provided in any embodiment of the present disclosure, and have corresponding functional modules for executing the method and achieve corresponding beneficial effects to which can be achieved through executing the method. For technical details not exhaustively described in the foregoing embodiments, reference may be made to the vehicle window color stripe processing method provided in any embodiment of the present disclosure.

The above are only some embodiments of the present application. The person skilled in the art may understand that the present application is not limited to the particular embodiments described herein, and that various obvious changes, readjustments and substitutions can be made by the person skilled in the art without departing from the scope of protection of the present application. Therefore, although the present application has been described through the above embodiments, the present application is not limited to the above embodiments, and may further include more other equivalent embodiments without departing from the concept of the present invention, and the scope of the present application is determined by the scope of the appended claims.

What is claimed is:

1. A vehicle window color stripe processing method, comprising:

extracting a first vehicle window image in a to-be-processed image, wherein the first vehicle window image is an image containing color stripes; and inputting the first vehicle window image into a pre-trained vehicle window color stripe processing model and obtaining a second vehicle window image output by the pretrained vehicle window color stripe processing model, wherein the second vehicle window image is an image without color stripe, or, an intensity of color stripes in the second vehicle window image is lower than an intensity of the color stripes in the first vehicle window image;

wherein the pre-trained vehicle window color stripe processing model is generated by training based on at least two vehicle window sample image pairs, and each of the at least two vehicle window sample image pairs comprises a first vehicle window sample image with color stripes and a second vehicle window sample image without color stripe corresponding to the first vehicle window sample image.

2. The method according to claim 1, wherein the method further comprises acquiring the at least two vehicle window sample image pairs comprising:

acquiring at least two vehicle sample image pairs by means of an image acquisition apparatus; wherein each vehicle sample image pair comprises a first vehicle sample image and a second vehicle sample image, the first vehicle sample image comprises a vehicle window image with color stripes, and the second vehicle sample image comprises a vehicle window image without color stripe;

performing pixel matching on the first vehicle sample image and the second vehicle sample image in each of the at least two vehicle sample image pairs;

performing vehicle window detection on a pixel-matched first vehicle sample image and a pixel-matched second vehicle sample image, and based on a vehicle window detection result, extracting a vehicle window image with color stripes from the pixel-matched first vehicle sample image, and extracting a vehicle window image without color stripe from the pixel-matched second vehicle sample image; and taking the vehicle window image with color stripes extracted and the vehicle window image without color stripe extracted as a vehicle window sample image pair in the training sample set.

3. The method according to claim 1, wherein the method further comprises acquiring the at least two vehicle window sample image pairs comprising:

based on a preset control condition, acquiring the first vehicle window sample image by a first image acquisition module in an image acquisition apparatus, and acquiring the second vehicle window sample image by a second image acquisition module in the image acquisition apparatus.

4. The method according to claim 3, wherein the first image acquisition module comprises a first flashlight and a first image sensor; the second image acquisition module comprises a second flashlight and a second image sensor; and a flash peak brightness of the second flashlight is greater than a flash peak brightness of the first flashlight, and a discharge time of the second flashlight is less than a discharge time of the first flashlight.

5. The method according to claim 4, wherein the preset control condition comprises that:

in response to a flash duration of the first flashlight reaching a first preset time, the first image sensor starts exposure;

in response to the exposure of the first image sensor ending, the second flashlight starts to flash; and in response to a flash duration of the second flashlight reaching a second preset time, the second image sensor starts exposure.

6. The method according to claim 5, wherein the preset control condition further comprises that an exposure time of the first image sensor and an exposure time of the second image sensor, and a gain of the first image sensor and a gain of the second image sensor satisfy a preset relationship condition;

wherein, the preset relationship condition comprises:

$$\Delta T_2 = \Delta T_1 / N$$
$$\Delta T_2 = \min(\Delta T_2, t_2 - \Delta t_2)$$
$$G_2 = \Delta T_1 \times G_1 / \Delta T_2$$

wherein, $$\Delta t_2 = \frac{M}{(\Delta T_1 \times G_1)}$$
$$\Delta t_2 = \min(\Delta t_2, t_2)$$

wherein, $\Delta T_1$ represents the exposure time of the first image sensor, $\Delta T_2$ represents the exposure time of the second image sensor, $G_1$ represents the gain of the first image sensor, $G_2$ represents the gain of the second image sensor, and $\Delta t_2$ represents the second preset time; $t_2$ represents an effective discharge time of the second flashlight, M represents a first preset constant, and N represents a second preset constant.

7. The method of claim 5, wherein a third preset time is at least one of the first preset time and the second preset time, and the third preset time is determined by at least one of the following means:

acquiring a first ambient light brightness; according to the first ambient light brightness and a preset positive proportional relationship between ambient light brightnesses and third preset times, determining a third preset time corresponding to the first ambient light brightness; wherein when the ambient light brightness is greater, the third preset time is longer; or, acquiring a second ambient light brightness and a brightness graph of a third flashlight;

and according to the second ambient light brightness and the brightness graph of the third flashlight, determining a third preset time corresponding to the third flashlight, wherein when a flash duration of the third flashlight reaches a corresponding third preset time, a brightness of the third flashlight is greater than or equal to the second ambient light brightness, and wherein the third flashlight is at least one of the first flashlight and the second flashlight.

8. The method according to claim 1, after the obtaining a second vehicle window image output by the pretrained vehicle window color stripe processing model, further comprising:

fusing the second vehicle window image with a background image in the to-be-processed image, to generate a target image, wherein the to-be-processed image comprises the background image and the first vehicle window image.

9. A non-transitory computer-readable storage medium storing a computer program, wherein the computer program, when executed by a processor, implements:

extracting a first vehicle window image in a to-be-processed image, wherein the first vehicle window image is an image containing color stripes; and inputting the first vehicle window image into a pre-trained vehicle window color Stripes processing model and obtaining a second vehicle window image output by the pretrained vehicle window color Stripes processing model, wherein the second vehicle window image is an image without color stripe, or, an intensity of color stripes in the second vehicle window image is lower than an intensity of the color stripes in the first vehicle window image;

wherein the pre-trained vehicle window color Stripes processing model is generated by training based on at least two vehicle window sample image pairs, and each of the at least two vehicle window sample image pairs comprises a first vehicle window sample image with color stripes and a second vehicle window sample image without color stripe corresponding to the first vehicle window sample image.

10. The storage medium according to claim 9, wherein the computer program, when executed by a processor, implements acquiring the at least two vehicle window sample image pairs comprising:

acquiring at least two vehicle sample image pairs by means of an image acquisition apparatus; wherein each vehicle sample image pair comprises a first vehicle sample image and a second vehicle sample image, the first vehicle sample image comprises a vehicle window image with color stripes, and the second vehicle sample image comprises a vehicle window image without color stripe;

performing pixel matching on the first vehicle sample image and the second vehicle sample image in each of the at least two vehicle sample image pairs;

performing vehicle window detection on a pixel-matched first vehicle sample image and a pixel-matched second vehicle sample image, and based on a vehicle window detection result, extracting a vehicle window image with color stripes from the pixel-matched first vehicle sample image, and extracting a vehicle window image without color stripe from the pixel-matched second vehicle sample image; and taking the vehicle window image with color stripes extracted and the vehicle window image without color stripe extracted as a vehicle window sample image pair in the training sample set.

11. The storage medium according to claim 9, wherein the computer program, when executed by a processor, implements acquiring the at least two vehicle window sample image pairs comprising:

based on a preset control condition, acquiring the first vehicle window sample image by a first image acquisition module in an image acquisition apparatus, and acquiring the second vehicle window sample image by a second image acquisition module in the image acquisition apparatus.

12. The storage medium according to claim 9, wherein the first image acquisition module comprises a first flashlight and a first image sensor; the second image acquisition module comprises a second flashlight and a second image sensor; and a flash peak brightness of the second flashlight is greater than a flash peak brightness of the first flashlight, and a discharge time of the second flashlight is less than a discharge time of the first flashlight.

13. An electronic device, comprising a memory, a processor, and a computer program stored on the memory and executable by the processor, wherein, the processor, when executing the computer program, implements;

extracting a first vehicle window image in a to-be-processed image, wherein the first vehicle window image is an image containing color stripes; and inputting the first vehicle window image into a pre-trained vehicle window color Stripes processing model and obtaining a second vehicle window image output by the pretrained vehicle window color Stripes processing model, wherein the second vehicle window image is an image without color stripe, or, an intensity of color stripes in the second vehicle window image is lower than an intensity of the color stripes in the first vehicle window image;

wherein the pre-trained vehicle window color Stripes processing model is generated by training based on at least two vehicle window sample image pairs, and each of the at least two vehicle window sample image pairs comprises a first vehicle window sample image with color stripes and a second vehicle window sample image without color stripe corresponding to the first vehicle window sample image.

14. The electronic device according to claim 13, wherein the processor, when executing the computer program, implements acquiring the at least two vehicle window sample image pairs comprising:

acquiring at least two vehicle sample image pairs by means of an image acquisition apparatus; wherein each vehicle sample image pair comprises a first vehicle sample image and a second vehicle sample image, the first vehicle sample image comprises a vehicle window image with color stripes, and the second vehicle sample image comprises a vehicle window image without color stripe;

performing pixel matching on the first vehicle sample image and the second vehicle sample image in each of the at least two vehicle sample image pairs;

performing vehicle window detection on a pixel-matched first vehicle sample image and a pixel-matched second vehicle sample image, and based on a vehicle window detection result, extracting a vehicle window image with color stripes from the pixel-matched first vehicle sample image, and extracting a vehicle window image without color stripe from the pixel-matched second vehicle sample image; and taking the vehicle window image with color stripes extracted and the vehicle window image without color stripe extracted as a vehicle window sample image pair in the training sample set.

15. The electronic device according to claim 13, wherein the processor, when executing the computer program, implements acquiring the at least two vehicle window sample image pairs comprising:

based on a preset control condition, acquiring the first vehicle window sample image by a first image acquisition module in an image acquisition apparatus, and acquiring the second vehicle window sample image by a second image acquisition module in the image acquisition apparatus.

16. The electronic device according to claim 15, wherein the first image acquisition module comprises a first flashlight and a first image sensor; the second image acquisition module comprises a second flashlight and a second image sensor; and a flash peak brightness of the second flashlight is greater than a flash peak brightness of the first flashlight, and a discharge time of the second flashlight is less than a discharge time of the first flashlight.

17. The electronic device according to claim 16, wherein the preset control condition comprises that:
in response to a flash duration of the first flashlight reaching a first preset time, the first image sensor starts exposure;
in response to the exposure of the first image sensor ending, the second flashlight starts to flash; and
in response to a flash duration of the second flashlight reaching a second preset time, the second image sensor starts exposure.

18. The electronic device according to claim 17, wherein the preset control condition further comprises that an exposure time of the first image sensor and an exposure time of the second image sensor, and a gain of the first image sensor and a gain of the second image sensor satisfy a preset relationship condition;
wherein, the preset relationship condition comprises:

$$\Delta T_2 = \Delta T_1 / N$$

$$\Delta T_2 = \min(\Delta T_2, t_2 - \Delta t_2)$$

$$G_2 = \Delta T_1 \times G_1 / \Delta T_2$$

wherein, $$\Delta t_2 = \frac{M}{(\Delta T_1 \times G_1)}$$

$$\Delta t_2 = \min(\Delta t_2, t_2)$$

wherein, $\Delta T_1$ represents the exposure time of the first image sensor, $\Delta T_2$ represents the exposure time of the second image sensor, $G_1$ represents the gain of the first image sensor, $G_2$ represents the gain of the second image sensor, and $\Delta t_2$ represents the second preset time; $t_2$ represents an effective discharge time of the second flashlight, M represents a first preset constant, and N represents a second preset constant.

19. The method of claim 17, wherein a third preset time is at least one of the first preset time and the second preset time, and the third preset time is determined by at least one of the following means:
acquiring a first ambient light brightness; according to the first ambient light brightness and a preset positive proportional relationship between ambient light brightnesses and third preset times, determining a third preset time corresponding to the first ambient light brightness; wherein when the ambient light brightness is greater, the third preset time is longer; or,
acquiring a second ambient light brightness and a brightness graph of a third flashlight; and according to the second ambient light brightness and the brightness graph of the third flashlight, determining a third preset time corresponding to the third flashlight, wherein when a flash duration of the third flashlight reaches a corresponding third preset time, a brightness of the third flashlight is greater than or equal to the second ambient light brightness, and wherein the third flashlight is at least one of the first flashlight and the second flashlight.

20. The electronic device according to claim 13, wherein the processor, when executing the computer program, implements:
after the obtaining a second vehicle window image output by the pretrained vehicle window color Stripes processing model, fusing the second vehicle window image with a background image in the to-be-processed image, to generate a target image, wherein the to-be-processed image comprises the background image and the first vehicle window image.

* * * * *